W. B. FETNER.
COLLAPSIBLE TAP.
APPLICATION FILED JULY 3, 1915.
1,160,868.
Patented Nov. 16, 1915.
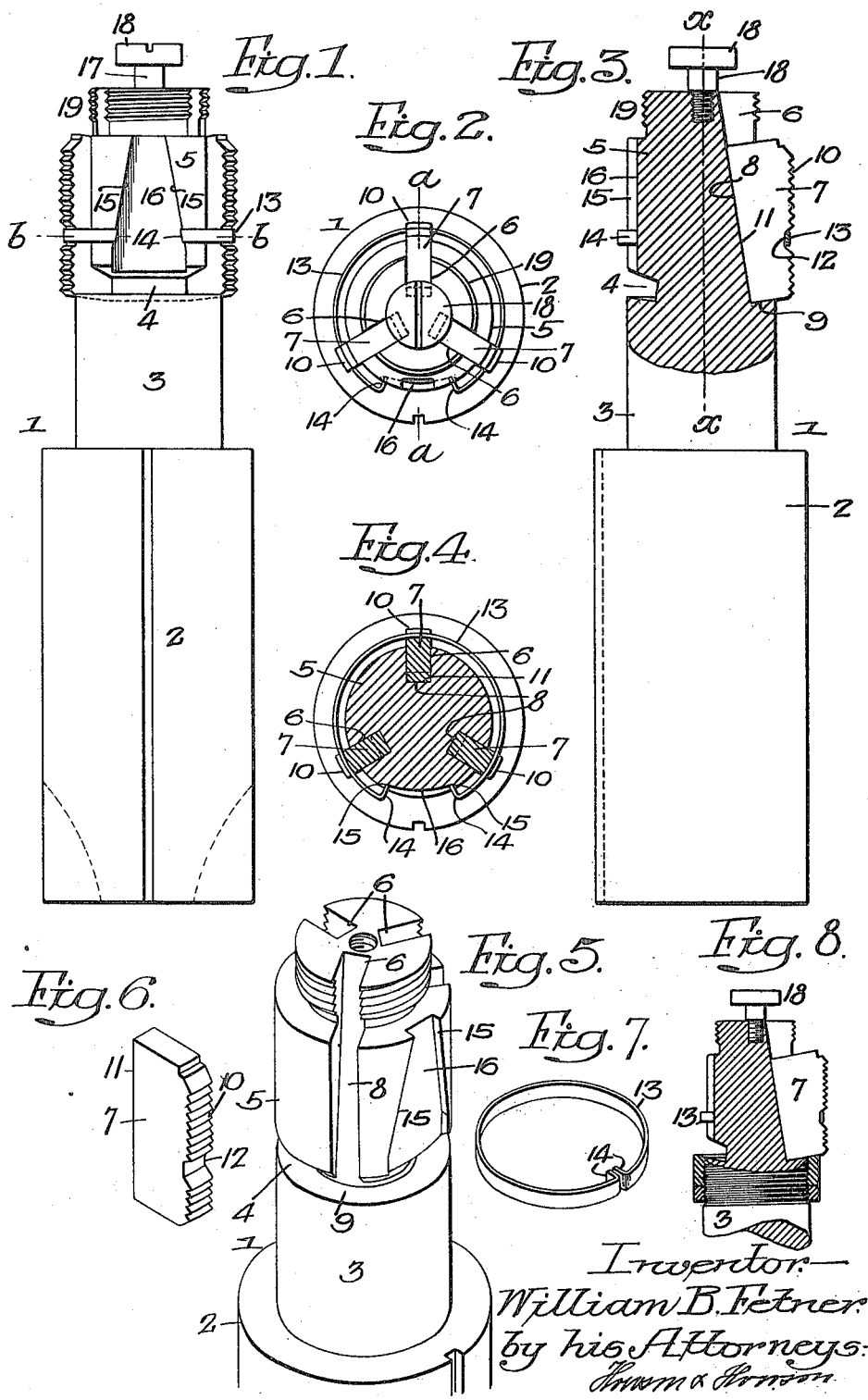
Inventor:—
William B. Fetner.
by his Attorneys

UNITED STATES PATENT OFFICE.

WILLIAM B. FETNER, OF RALEIGH, NORTH CAROLINA, ASSIGNOR OF ONE-HALF TO LOVIC R. GILBERT, OF RALEIGH, NORTH CAROLINA.

COLLAPSIBLE TAP.

1,160,868.  Specification of Letters Patent.  Patented Nov. 16, 1915.

Application filed July 3, 1915. Serial No. 37,842.

*To all whom it may concern:*

Be it known that I, WILLIAM B. FETNER, a citizen of the United States, and a resident of Raleigh, county of Wake, State of North Carolina, have invented certain Improvements in Collapsible Taps, of which the following is a specification.

One object of my invention is to construct a collapsible tap so that it can be inserted in a hole which does not extend entirely through a body and which can be quickly removed by withdrawing the tap which will cause the cutting portion to be collapsed, allowing it to be withdrawn from the hole.

A further object of the invention is to construct the tap so that the cutting bits will be held perfectly solid against a shoulder which will not resist the collapsing of the tap when it is withdrawn.

Machines that are used for tapping hollow objects are mostly engine lathes, turret lathes, and boring mills. On each of these machines the stock or material being cut or bored turns and the tap, or other tool, is kept stationary and the general practice has been to tap the hole and then reverse the mechanism so as to allow the tap to be slowly withdrawn from the hole.

This takes considerable time and one of the objects of my invention, as hereinbefore stated, is to provide a collapsible tap for this purpose.

In the accompanying drawings: Figure 1 is a side view of my improved collapsible tap; Fig. 2 is a plan view; Fig. 3 is a side view, partly in section, on the line $a$—$a$, Fig. 2; Fig. 4 is a sectional plan view on the line $b$—$b$, Fig. 1; Fig. 5 is a perspective view of the body portion; Fig. 6 is a perspective view of one of the bits; Fig. 7 is a perspective view of the spring for retaining the cutting bits in the grooves of the body of the die, and Fig. 8 is a view of a modification.

Referring to the drawings, 1 is the body of the die having a shank 2 of any suitable form according to the tool in which the die is to be mounted. In the present instance, the body has a portion 3 which is reduced at 4 so as to form a head 5 which is grooved, as at 6, to receive the three cutting bits 7. The rear wall 8 of each groove is at an angle in respect to the longitudinal line $x$ through the body of the bit and the shoulder 9 is at right angles to the rear wall 8. The cutting bits 7 are tapered, each having a cutting face 10 and a rear bearing face 11 arranged to bear against the inclined wall 8. The upper and the lower edges of the bit are arranged at right angles to the bearing face 11 so that the bit will fit against the wall 8 and the shoulder 9, when in the cutting position. The face of each bit is notched at 12 to receive the spring 13. The notch is of such a depth that the spring will clear the threads cut by the bit.

The spring, in the present instance, is made as clearly shown in Fig. 7, in the form of a split ring having the ends 14 turned in to engage the shoulders 15 formed by recessing the body portion, as at 16. The recess is on a taper so that, as the body portion is retracted after the thread is cut, the spring 13 will remain with the bits and will be retracted as the body portion is withdrawn in order that the pressure may be the same whether the bits are in the extended or the contracted position. At the end of the body portion of the bit is a screw 17 having a head 18 which overlaps the groove 6 in the body portion and this head limits the movement of the bits as they are retracted. The section 19 of the body is reduced and threaded for the reception of a cap or clutch which is used in cutting threads in the dies or sharpening the cutters of the bits that are worn. When it is desired to remove the bits, all that is necessary is to release the spring and to substitute one set of bits for another and to replace the spring.

The operation is as follows: The cutting bits are located in the tap, as shown in Fig. 1, and after the hole is bored the tap is applied to the article either by holding the tap stationary and turning the article or by holding the article stationary and turning the tap. The tap will cut the thread in the opening to any depth required and, in the present instance, the extension is so formed that the tap will cut the thread to a shoulder and then by withdrawing the tap or the article, the bits, owing to the cutting faces engaging the cut thread, will tend to remain in the article while the body portion is removed, and, as the tap is withdrawn, the tapered portion recedes from the back of the bits and the spring retracts the bits until they are free of the cut thread when the entire tap, with the bits, can be removed. Then, by merely forcing the bits down onto the shoulder with the hand the spring will yield so that when the bits come in contact with the shoulder they are ready to cut a thread in another article.

In Fig. 8, I have shown an adjustable shoulder in the form of a nut so that the bits can be adjusted to accommodate holes of varying diameters.

I claim:

1. The combination in a collapsible tap, of a portion having longitudinal grooves therein, the rear walls of which are inclined; tapered bits mounted in the grooves, each bit being arranged to slide on the inclined rear wall of its groove and having a cutting edge at one face, said cutting edge being recessed; and an annular spring located in the recesses of the bits and yieldingly retaining the bits against the rear wall.

2. The combination in a collapsible tap, of a body portion having longitudinal grooves therein, the rear wall of each groove being inclined; a shoulder at the inner end of the groove at right angles to the inclined walls; bits adapted to the grooves and arranged to slide on the inclined walls and to rest against the shoulders when in the cutting position; and a spring tending to retain the bits against the inclined walls.

3. The combination in a collapsible tap, of a body portion having longitudinal grooves therein, each groove terminating at the inner end at a shoulder, the rear wall of each groove being arranged on an incline with respect to the longitudinal line of the tap, the shoulder being at right angles to said inclined wall; a bit adapted to each groove, the inner end of each bit being at right angles to the back thereof so that when the bit is in the cutting position it will fit against the inclined wall of the groove and against the shoulder; and means for yieldingly holding the bits in their grooves so that it can slide on the inclined walls of the body portion.

4. The combination in a collapsible tap, of a body portion having longitudinal grooves therein, the rear wall of each groove being at an incline to the longitudinal line through the tap; bits adapted to the grooves, the body portion being recessed between two of said bits to form shoulders; and a spring bearing upon the bits and having portions engaging said shoulders.

5. The combination in a collapsible tap, of a body portion having longitudinal grooves therein, the rear walls of each groove being inclined to the longitudinal line through the tap; inclined shoulders formed on the body portion between two of the grooves; and a spring having inturned ends encircling the body portion and engaging the shoulders, said spring yieldingly holding the bits in position in the grooves.

6. The combination in a collapsible tap, of a body portion having a series of longitudinal grooves therein, the rear wall of each groove being inclined to the longitudinal line through the bit, each groove terminating in a shoulder at right angles to the said wall; a tapered bit adapted to each groove and having a cutting edge at one face, said cutting edge being recessed; and a spring encircling the tap and extending into the recesses of the bits, said body portion having shoulders formed thereon with which the spring engages.

7. The combination in a collapsible tap, of a body portion having longitudinal grooves therein, the rear wall of each groove being inclined to the longitudinal line through the tap; a shoulder at one end of each groove; a head at the opposite end which extends over the grooves; a bit mounted in each groove and adapted to rest against the rear wall and the shoulder, each bit being less in length than the distance between the shoulder and the head; and means for retaining the bits in the grooves.

8. The combination in a collapsible tap, of a body portion having a series of longitudinal grooves, the rear wall of each groove being inclined to the longitudinal line through the body portion and terminating at the rear end in a shoulder; a screw secured to the outer end of the body portion and having a head extending over the grooves; a bit adapted to each groove and arranged to bear against the shoulder when in the operating position, the bits being less in length than the distance between the shoulder and the head of the screw; and a spring encircling the tap at the bits so as to yieldingly hold the bits in position.

9. The combination in a collapsible tap, of a body portion having longitudinal grooves therein, the rear walls of which are inclined to the longitudinal line through the body portion; a bit mounted in each groove; means for holding the bits against the rear walls, the body portion having shoulders against which the inner ends of the bits rest when in action, the body portion having a threaded extension less in diameter than the main body portion and adapted to receive a cap, or clutch, to hold the bits against longitudinal movement.

10. The combination in a collapsible tap, of a body portion having longitudinal grooves therein, the rear wall of each groove being inclined; a nut mounted on the body portion of the tap and forming an adjustable shoulder at the inner end of the groove; and bits adapted to the grooves and arranged to slide on the inclined walls thereof and to rest against said nut when in the cutting position so that, on turning the nut, the bits can be projected or retracted.

WILLIAM B. FETNER.

Copies of this patent may be obtained for five cents each, by addressing the "Commissioner of Patents, Washington, D. C."